United States Patent [19]
Ruman

[11] Patent Number: 5,878,708
[45] Date of Patent: Mar. 9, 1999

[54] OIL MANAGEMENT SYSTEM FOR A FUEL INJECTED ENGINE

[75] Inventor: Mark A. Ruman, Fond Du Lac, Wis.

[73] Assignee: Brunswick Corporation, Lake Forest, Ill.

[21] Appl. No.: 984,101

[22] Filed: Dec. 3, 1997

[51] Int. Cl.⁶ ..................................................... F01M 1/00
[52] U.S. Cl. ..................................................... 123/196 M
[58] Field of Search ........................... 123/196 R, 196 M

[56] References Cited

U.S. PATENT DOCUMENTS 4,059,086  11/1977  Tsubouchi ........................... 123/196 M Primary Examiner—Noah P. Kamen
Attorney, Agent, or Firm—William D. Lanyi

[57] ABSTRACT

Oil flow from an air compressor is directed to a nozzle within or near the entrance of an intake manifold of an engine. Air is directed to the nozzle from a pressure regulator associated with the air compressor. The air is used to atomize the liquid lubricant and create a fine mist that is injected into the air intake manifold and evenly distribute the lubricant to the cylinders of the engine.

4 Claims, 2 Drawing Sheets

OIL MANAGEMENT SYSTEM FOR A FUEL INJECTED ENGINE

BACKGROUND OF THE INVENTION

1. Field of the Invention

The present invention is generally related to a lubricant management system for an internal combustion engine and, more particularly, to a system that provides a means and method for accommodating the lubricating oil used to lubricate an air compressor.

2. Description of the Prior Art

In fuel injected engines, in which the fuel must be injected into the combustion chamber at a relatively high pressure, an air compressor is generally required to provide the pressure. Certain types of fuel injection systems, such as that which injects the fuel into the crankcase or at the cylinder wall of the engine, do not require air compressors because they inject the fuel into a lower pressure region than direct fuel injection which injects the fuel into the high pressure region of a combustion chamber. Additionally, direct fuel injection systems typically require that the fuel spray have superior atomization quality.

Direct fuel injection necessitates the use of an air compressor for the reasons described above. The air compressor must be lubricated to prevent excessive wear and eventual failure because of friction within the compressor. In a typical application of a direct fuel injected engine, a flow of lubricant, such as motor oil, is provided to the air compressor at an inlet of the air compressor and the oil is removed from the compressor at an outlet of the air compressor. The oil removed from the air compressor must be disposed of in some appropriate manner. Engines known to those skilled in the art typically direct the flow of lubricating oil from the compressor to the intake manifold of the engine. The seepage of oil through this conduit is drawn from the end of the conduit into the air stream of the intake manifold and then into the cylinders where it experiences combustion along with the fuel/air mixture provided to the engine. In some cases, this method of disposing of the air compressor lubricant is satisfactory. However, in other circumstances, the oil can be disproportionally carried to one cylinder to the extent that it is much greater than the lubricant carried to the other cylinders. When this occurs, the cylinder receiving the oil can become excessively fouled. This creates a deleterious situation.

It would therefore be beneficial if a means or method could be provided to more equally distribute the flow of oil from the air compressor to all of the cylinders of the engine.

SUMMARY OF THE INVENTION

An engine made in accordance with the preferred embodiment of the present invention comprises a fuel injection system and an air compressor for providing pressurized air to the fuel injection system. The air compressor has a lubricant inlet and a lubricant outlet. Oil, or another type of lubricant, is provided to the lubricant inlet and flows through selected portions of the air compressor to prevent frictional wear. After passing through the selected portions of the compressor, the oil leaves the structure of the air compressor through the lubricant outlet. A nozzle is disposed proximate an air intake port of the engine. The nozzle can be disposed within the structure of the intake manifold or at any other appropriate location that will allow a spray from the nozzle to be drawn into the intake port of the engine. A lubricant conduit, or oil tube, is connected in fluid communication between the lubricant outlet of the compressor and the nozzle. An air conduit is connected in fluid communication between the nozzle and the air compressor. In this manner, the flow of air through the nozzle draws the lubricant through the nozzle and atomizes the lubricant to form a spray or mist. This mist is then drawn into the intake manifold by the flow of air passing into the engine and distributed in a generally equal manner to all of the cylinders of the engine.

Described in alternative terminology, the present invention comprises a means for injecting fuel into a plurality of cylinders of the engines, a means for pressurizing air and supplying the air to the injecting means, means for providing a lubricant to the pressurizing means, means for removing the lubricant from the pressurizing means, means for atomizing the lubricant, means for conducting the lubricant from the removing means of the compressor to the atomizing means. The present invention also comprises a means for conducting the air from the pressurizing means, or compressor, to the atomizing means, or nozzle. This causes the lubricant from the removing means to be atomized by the air flow through the air conducting means and the atomized lubricant is sprayed into the air intake port for combustion within a plurality of cylinders of the engine.

In operation, the lubricating system of the present invention performs the method of injecting fuel into a plurality of cylinders, pressurizing air and supplying the air to a device for performing the injecting step, providing a lubricant to a device which performs the pressurizing step, removing the lubricant from the device which performs the pressurizing step, atomizing the lubricant with a device which is disposed proximate an air intake port of the engine, conducting the lubricant from a conduit for performing the removing step to a device which performs the atomizing step, and conducting the air from the device which performs the pressurizing step to the device which performs the atomizing step so that the lubricant from the conduit for performing the removing step is atomized by the air flowing through the device which performs the air conducting step and is sprayed into the air intake port for combustion within a plurality of cylinders of the engine.

BRIEF DESCRIPTION OF THE DRAWINGS

The present invention will be more fully and clearly understood from a reading of the description of the preferred embodiment in conjunction with the drawings, in which.

DESCRIPTION OF THE PREFERRED EMBODIMENT

Figure 1:
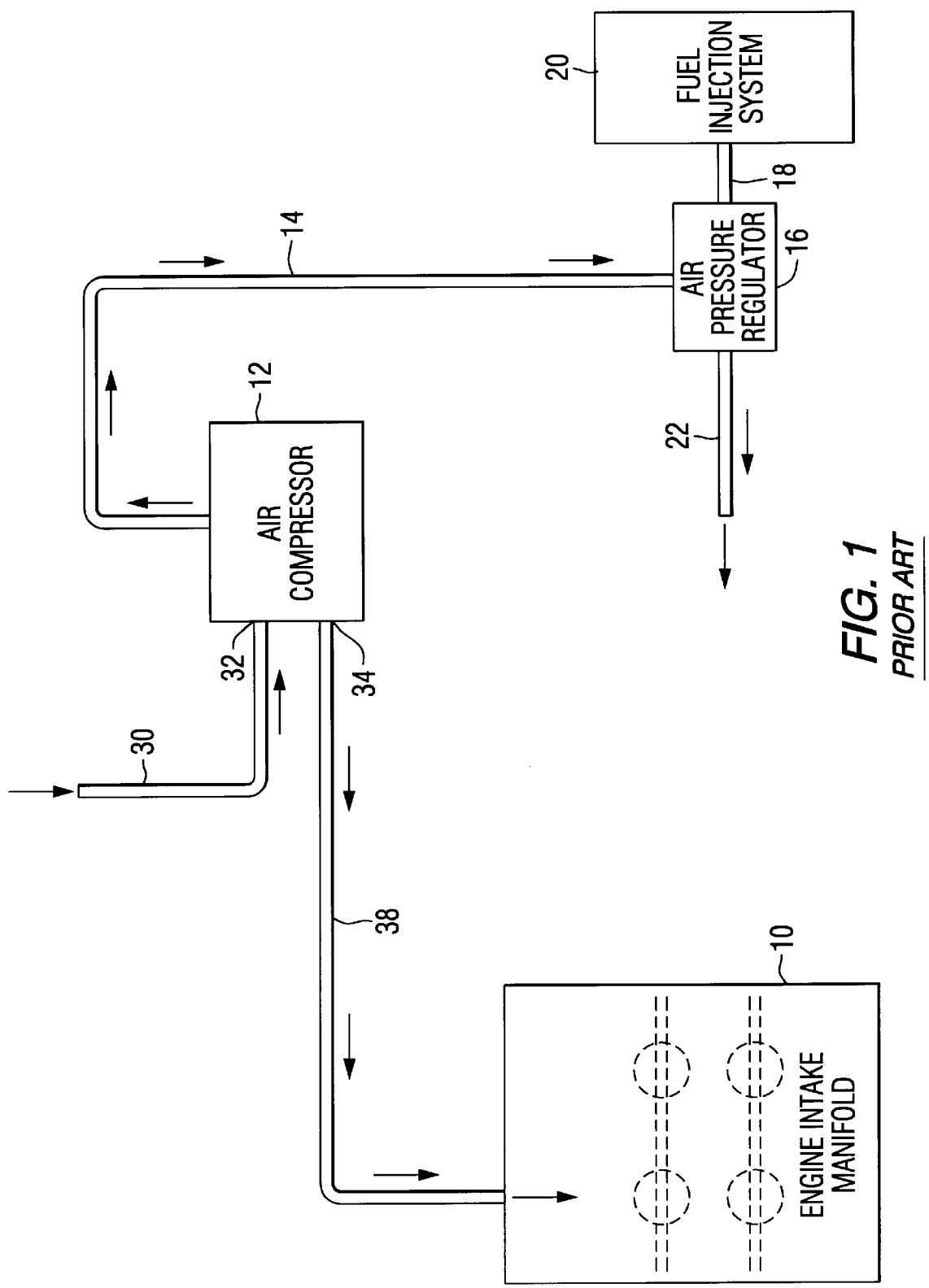
FIG. 1 shows a prior art oil lubrication system for an air compressor.

Throughout the description of the preferred embodiment, like components will be identified by like reference numerals.

FIG. 1 is a schematic representation of a lubricant management system for an air compressor which is generally known to those skilled in the art. An engine intake manifold 10 is represented by a box with four throttle plates schematically illustrated therein by dashed lines. An air compressor 12 provides pressurized air through conduit 14 to an air pressure regulator 16. The air pressure regulator 16 provides a source of air at approximately 80 psi through conduit 18 to a fuel injection system 20. The fuel injection system 20 typically comprises a plurality of fuel injectors connected to a common rail which provides pressurized air to all of the injectors. Air provided through conduit 14 in excess of the predetermined pressure, at which the regulator 16 is set, passes through conduit 22 and is exhausted from the system.

The air compressor 12 requires lubrication. In a typical application of an air compressor 12, a lubricant supply conduit 30 is connected to a lubricant inlet 32 of the air compressor. A lubricant, such as oil, flows in the directions indicated by the arrows through conduit 30 and lubricant inlet 32 to lubricate preselected portions of the air compressor 12. After the lubricant flows into the compressor, it passes through a lubricant outlet 34 and into a lubricant outlet conduit 38. The lubricant then flows into the intake manifold 10 of the engine.

As described above, one of the cylinders can receive a disproportionately large amount of oil in a system such as that illustrated in FIG. 1. The oil flows slowly through conduit 38 and drips into the air intake manifold in a generally haphazard manner. This causes the lubricant to collect and flow along the walls of the air intake manifold and this can lead to the lubricant flowing to one cylinder in much greater quantities than the other cylinders. Fouling of the cylinder can be caused by excessive oil flow to one cylinder.

Figure 2:
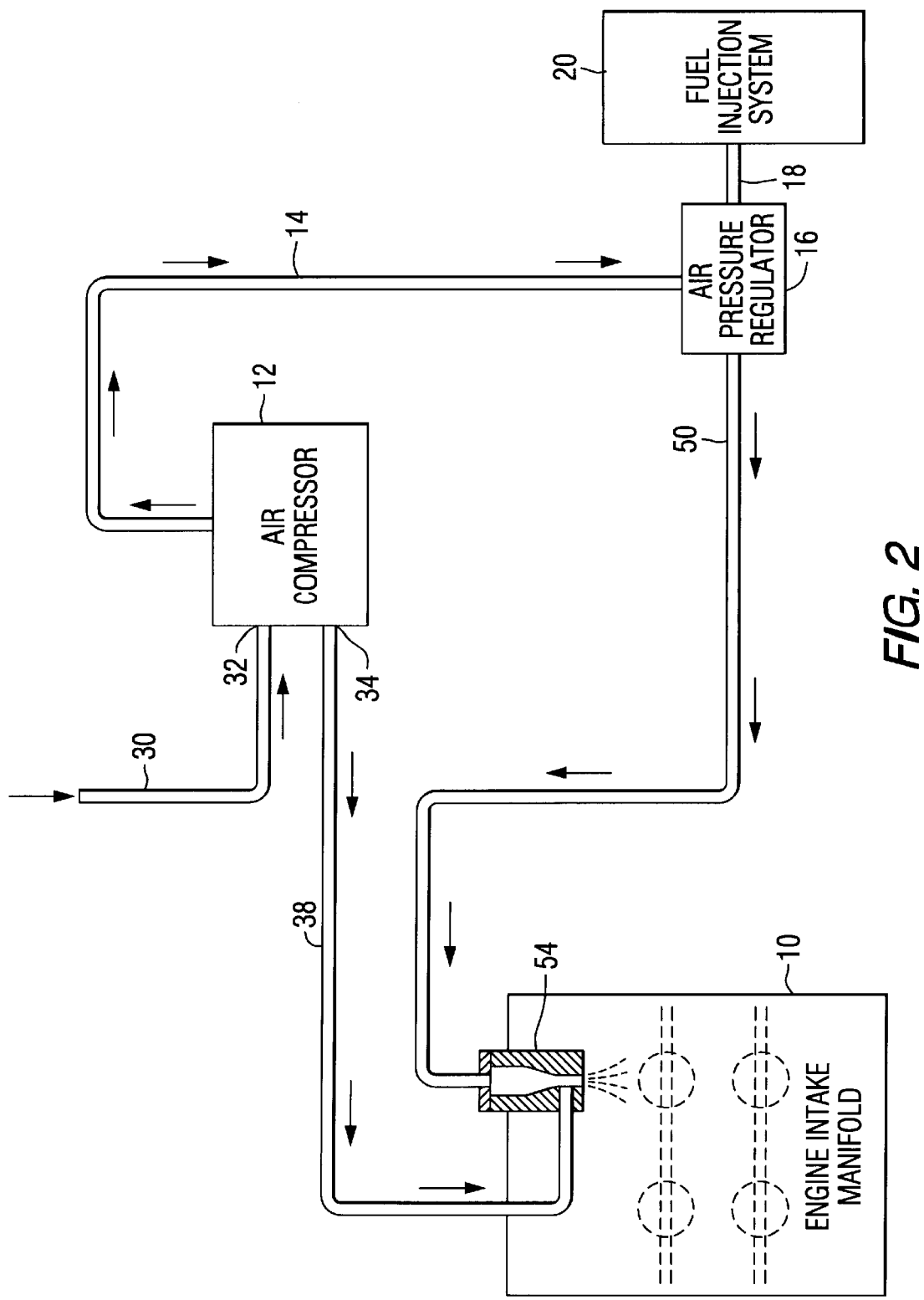
FIG. 2 is a schematic representation of an oil lubrication system made in accordance with the present invention.

FIG. 2 shows a preferred embodiment of the present invention. The air compressor 12 and the fuel injection system 20 are connected in combination with conduits 14, 18 and 30 in the manner described above in reference to FIG. 1. However, the present invention shown in FIG. 2 provides a significant advantage by having two distinct characteristics that are different than the system in FIG. 1. Rather than have a conduit 22 through which the pressure regulator 16 dumps excess air, the present invention provides a conduit 50 that connects the pressure regulator 16 to a nozzle 54. The excess pressurized air flowing from the air compressor 12 and passing through the regulator 16 is directed to the nozzle 54 and then exhausted into the intake manifold 10. The oil that flows from the outlet 34 of the compressor 12 is directed through conduit 38 to the structure associated with the nozzle 54. Oil is delivered in a low pressure region of the nozzle (after the nozzle throat) so as not to pressurize the oil return line. The oil flowing from the outlet 34 can be directed from conduit 38 into conduit 50 or, alternatively, directly into a nozzle 54 whose structure is adapted to combine the liquid and gas flows within its body. Either adaptation is within the scope of the present invention. The excess oil flowing from the air compressor 12 is carried by the stream of air flowing through conduit 50 and atomized by the nozzle 54. This structure produces a mist of atomized liquid that is then drawn into the cylinders by the air flowing into the intake manifold structure 10. In this way, the oil is evenly distributed among the cylinders and the disadvantages described above are avoided.

Although the present invention has been described to illustrate a particular embodiment, it should be understood that other embodiments are also within its scope.

I claim:

1. An engine, comprising:

a fuel injection system;

an air compressor for providing pressurized air to said fuel injection system, said air compressor having a lubricant inlet and a lubricant outlet for the purpose of directing a flow of lubricant in contact with moving components of said compressor;

a nozzle disposed proximate an air intake port of said engine;

a lubricant conduit connected in fluid communication between said lubricant outlet of said compressor and said nozzle to direct said flow of said lubricant from said moving components of said compressor to said nozzle;

an air conduit connected in fluid communication between said nozzle and said air compressor; and whereby said lubricant flow from said lubricant outlet of said air compressor is atomized by air flowing through said air conduit from said air compressor and sprayed into said air intake port for combustion within a plurality of cylinders within said engine.

2. The engine of claim 1, wherein:

said fuel injection system comprises a plurality of injectors, each of said plurality of injectors being associated with one of said plurality of cylinders.

3. An engine, comprising:

means for injecting fuel into a plurality of cylinders of said engine;

means for pressurizing air and supplying said air to said injecting means;

means for providing a lubricant to said pressurizing means to lubricate moving components of said pressurizing means;

means for removing said lubricant from said pressurizing means after it has lubricated said moving components of said pressurizing means;

means for atomizing a liquid, said atomizing means being disposed proximate an intake port of said engine;

means for conducting said lubricant from said removing means to said atomizing means after said lubricant has lubricated said moving components of said pressurizing means; and means for conducting said air from said pressurizing means to said atomizing means, whereby said lubricant from said removing means is atomized by said air flowing through said air conducting means after said lubricant has lubricated said moving components of said pressurizing means and is sprayed into said air intake port for combustion within a plurality of cylinders within said engine.

4. A method for managing a lubricating system for an engine, comprising:

injecting fuel into a plurality of cylinders of said engine;

pressurizing air and supplying said air to a device for performing said injecting step;

providing a lubricant to lubricate moving components of a device which performs said pressurizing step;

removing said lubricant from said device which performs said pressurizing step after said lubricant has lubricated said moving components of said device which performs said pressurizing step;

atomizing said lubricant with a device which is disposed proximate an intake port of said engine;

conducting said lubricant from a conduit for performing said removing step to a device which performs said atomizing step; and conducting said air from said device which performs said pressurizing step to said device which performs said atomizing step after said lubricant has lubricated said moving components of said device which performs said pressurizing step, whereby said lubricant from said conduit o for performing said removing step is atomized by said air flowing through a device which performs said air conducting step and is sprayed into said air intake port for combustion within a plurality of cylinders within said engine.

* * * * *